US011508276B2

United States Patent
Agrawal et al.

(10) Patent No.: US 11,508,276 B2
(45) Date of Patent: Nov. 22, 2022

(54) ADAPTIVE USER INTERFACE DISPLAY SIZE FOR CURVED DISPLAY EDGES

(71) Applicant: Motorola Mobility LLC, Chicago, IL (US)

(72) Inventors: Amit Kumar Agrawal, Bangalore (IN); Olivier David Meirhaeghe, Lincolnshire, IL (US); Fred Allison Bower, III, Durham, NC (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/025,131

(22) Filed: Sep. 18, 2020

(65) Prior Publication Data

US 2022/0093023 A1    Mar. 24, 2022

(51) Int. Cl.
  *G09G 3/00* (2006.01)
  *G09G 5/373* (2006.01)
  *G06F 3/0488* (2022.01)
  *G06F 3/0482* (2013.01)

(52) U.S. Cl.
  CPC .............. *G09G 3/03* (2020.08); *G09G 5/373* (2013.01); *G06F 3/0482* (2013.01); *G06F 3/0488* (2013.01); *G09G 2340/14* (2013.01); *G09G 2354/00* (2013.01)

(58) Field of Classification Search
  CPC ...... G09G 2354/00; G09G 3/03; G09G 5/373; G09G 2340/14; G06F 3/0482; G06F 3/0488
  See application file for complete search history.

(56) References Cited

U.S. PATENT DOCUMENTS

| | | |
|---|---|---|
| 8,493,342 B2 | 7/2013 | Park et al. |
| 8,769,431 B1 | 7/2014 | Prasad |
| 8,924,894 B1 | 12/2014 | Yaksick et al. |
| 9,401,984 B1 | 7/2016 | Alameh et al. |
| 9,851,883 B2 | 12/2017 | Terrero et al. |
| 10,572,007 B2 | 2/2020 | Agarwal et al. |

(Continued)

OTHER PUBLICATIONS

"Non-Final Office Action", U.S. Appl. No. 16/903,717, dated Nov. 10, 2020, 11 pages.

(Continued)

*Primary Examiner* — Michelle L Sams
(74) *Attorney, Agent, or Firm* — FIG. 1 Patents

(57) ABSTRACT

In aspects of adaptive user interface display size for curved display edges, a wireless device has a display screen with curved display edges to display a user interface that includes selectable elements, which are selectable to initiate respective device application actions. The wireless device implements a display control module that can determine a display size of the user interface effective to prevent the selectable elements of the user interface from being displayed within a curved display edge of the display screen. The display control module can then resize the user interface according to the determined display size, and initiate to display the user interface on the display screen, where at least a portion of the user interface is displayable within the curved display edges of the display screen and without the selectable elements of the user interface being displayed within the curved display edge of the display screen.

20 Claims, 6 Drawing Sheets

(56) References Cited

U.S. PATENT DOCUMENTS

| | | |
|---|---|---|
| 10,817,173 B2 | 10/2020 | DeBates et al. |
| 10,831,318 B2 | 11/2020 | Liu et al. |
| 11,287,972 B1 | 3/2022 | Bower et al. |
| 2005/0012723 A1 | 1/2005 | Pallakoff |
| 2010/0117975 A1 | 5/2010 | Cho |
| 2011/0082620 A1 | 4/2011 | Small et al. |
| 2011/0117970 A1 | 5/2011 | Choi |
| 2012/0032979 A1 | 2/2012 | Blow et al. |
| 2012/0075351 A1 | 3/2012 | Imai et al. |
| 2013/0038564 A1 | 2/2013 | Ho |
| 2013/0159931 A1 | 6/2013 | Lee et al. |
| 2013/0222338 A1 | 8/2013 | Gim et al. |
| 2013/0324093 A1 | 12/2013 | Santamaria et al. |
| 2013/0342672 A1 | 12/2013 | Gray et al. |
| 2014/0051406 A1 | 2/2014 | Kim et al. |
| 2015/0261376 A1* | 9/2015 | Kim .................. G06F 1/1626 345/173 |
| 2015/0363086 A1 | 12/2015 | Uno |
| 2016/0062515 A1 | 3/2016 | Bae et al. |
| 2016/0110098 A1 | 4/2016 | Stewart et al. |
| 2016/0291731 A1 | 10/2016 | Liu et al. |
| 2016/0291764 A1 | 10/2016 | Herring et al. |
| 2016/0313966 A1 | 10/2016 | Jeong et al. |
| 2016/0320866 A1 | 11/2016 | Parham |
| 2016/0320966 A1 | 11/2016 | Ryu et al. |
| 2017/0102872 A1* | 4/2017 | Kim .................. G06F 1/1626 |
| 2017/0212631 A1 | 7/2017 | Kim et al. |
| 2017/0231148 A1 | 8/2017 | Miwa |
| 2017/0366555 A1 | 12/2017 | Matus |
| 2018/0239482 A1 | 8/2018 | Hinckley |
| 2018/0242242 A1 | 8/2018 | Lee et al. |
| 2019/0018461 A1 | 1/2019 | DeBates et al. |
| 2019/0018588 A1 | 1/2019 | DeBates et al. |
| 2019/0020760 A1 | 1/2019 | DeBates et al. |
| 2019/0052744 A1 | 2/2019 | Jung et al. |
| 2019/0179487 A1* | 6/2019 | Kong .................. G06F 3/0418 |
| 2020/0201501 A1 | 6/2020 | Rho et al. |
| 2021/0397264 A1 | 12/2021 | Jain et al. |
| 2022/0035412 A1 | 2/2022 | Agrawal et al. |
| 2022/0038572 A1 | 2/2022 | Agrawal et al. |
| 2022/0066564 A1 | 3/2022 | Agrawal et al. |
| 2022/0091737 A1 | 3/2022 | Bower et al. |

OTHER PUBLICATIONS

"Final Office Action", U.S. Appl. No. 16/903,717, dated Jun. 7, 2021, 13 pages.
"Non-Final Office Action", U.S. Appl. No. 17/025,170, dated Jun. 18, 2021, 10 pages.
"Final Office Action", U.S. Appl. No. 17/025,170, dated Dec. 7, 2021, 9 pages.
"Non-Final Office Action", U.S. Appl. No. 17/002,027, dated Nov. 23, 2021, 13 pages.
"Non-Final Office Action", U.S. Appl. No. 16/944,007, dated Nov. 9, 2021, 15 pages.
"Notice of Allowance", U.S. Appl. No. 17/025,170, dated Jan. 31, 2022, 10 pages.
Agrawal, Amit Kumar et al., "U.S. Application as Filed", U.S. Appl. No. 17/575,338, filed Jan. 13, 2022, 64 pages.
Bandameedipalli, Jyothsna et al., "U.S. Application as Filed", U.S. Appl. No. 17/575,356, filed Jan. 13, 2022, 63 pages.
"Non-Final Office Action", U.S. Appl. No. 16/903,717, dated Mar. 15, 2022, 12 pages.
"Non-Final Office Action", U.S. Appl. No. 16/944,037, dated Mar. 16, 2022, 11 pages.
"Supplemental Notice of Allowability", U.S. Appl. No. 17/025,170, dated Mar. 3, 2022, 3 pages.
U.S. Appl. No. 16/944,007, "Advisory Action", U.S. Appl. No. 16/944,007, dated Aug. 8, 2022, 3 pages.
U.S. Appl. No. 16/944,007, "Final Office Action", U.S. Appl. No. 16/944,007, dated May 31, 2022, 17 pages.
U.S. Appl. No. 16/903,717, "Notice of Allowance", U.S. Appl. No. 16/903,717, dated Sep. 21, 2022, 5 pages.
U.S. Appl. No. 16/944,037, "Notice of Allowance", U.S. Appl. No. 16/944,037, dated Oct. 12, 2022, 5 pages.

* cited by examiner

ADAPTIVE USER INTERFACE DISPLAY SIZE FOR CURVED DISPLAY EDGES

BACKGROUND

Devices such as smart devices, mobile devices (e.g., cellular phones, tablet devices, smartphones), consumer electronics, and the like can be implemented with various display screen configurations. For example, a smartphone may be implemented with a display screen that is flat and encompasses most of one side of the device. More recently, some mobile devices are designed with a curved display screen that wraps around all or part of the vertical sides of a device. Generally, a curved display screen has a curved edge on both vertical sides of a device, and the curved edges can be used to display user interface content and other display screen content. While the curved edges of a curved display screen generally enhances the aesthetics of a device, the curved edges introduce various design and usability challenges, particularly for user interface selectable controls that may be displayed within the curved edges of the display. Notably, a user interface selectable control displayed within a curved edge of the display screen may not register a user touch input to select and initiate the selectable control.

Generally, mobile devices may operate in different modes with various user interfaces that include selectable controls, some of which may be displayed within the curved edges of a device display. For example, a mobile device can operate for typical use in a high-power mode when turned on, and a home screen user interface includes selectable controls, such as to initiate device applications. A mobile device may also be operational with a lock screen from which some device features can be activated, such as quick activation of the device camera, emergency call functions, a flashlight, and other lock screen features, even though general use of the device is locked. Additionally, a mobile device may operate in a low-power mode with an always-on-display (AoD) in which the device processor is typically powered-down and the device display is implemented for low-power usage. In any of these device operational modes, the user interface selectable controls displayed within a curved edge of a curved display screen may be difficult for a user to select or touch contact, particularly for selectable controls that are displayed over the curved transition from the flat part of the display screen to the curved display edge of the display screen.

BRIEF DESCRIPTION OF THE DRAWINGS

Implementations of the techniques for adaptive user interface display size for curved display edges are described with reference to the following Figures. The same numbers may be used throughout to reference like features and components shown in the Figures.

DETAILED DESCRIPTION

Figure 1:
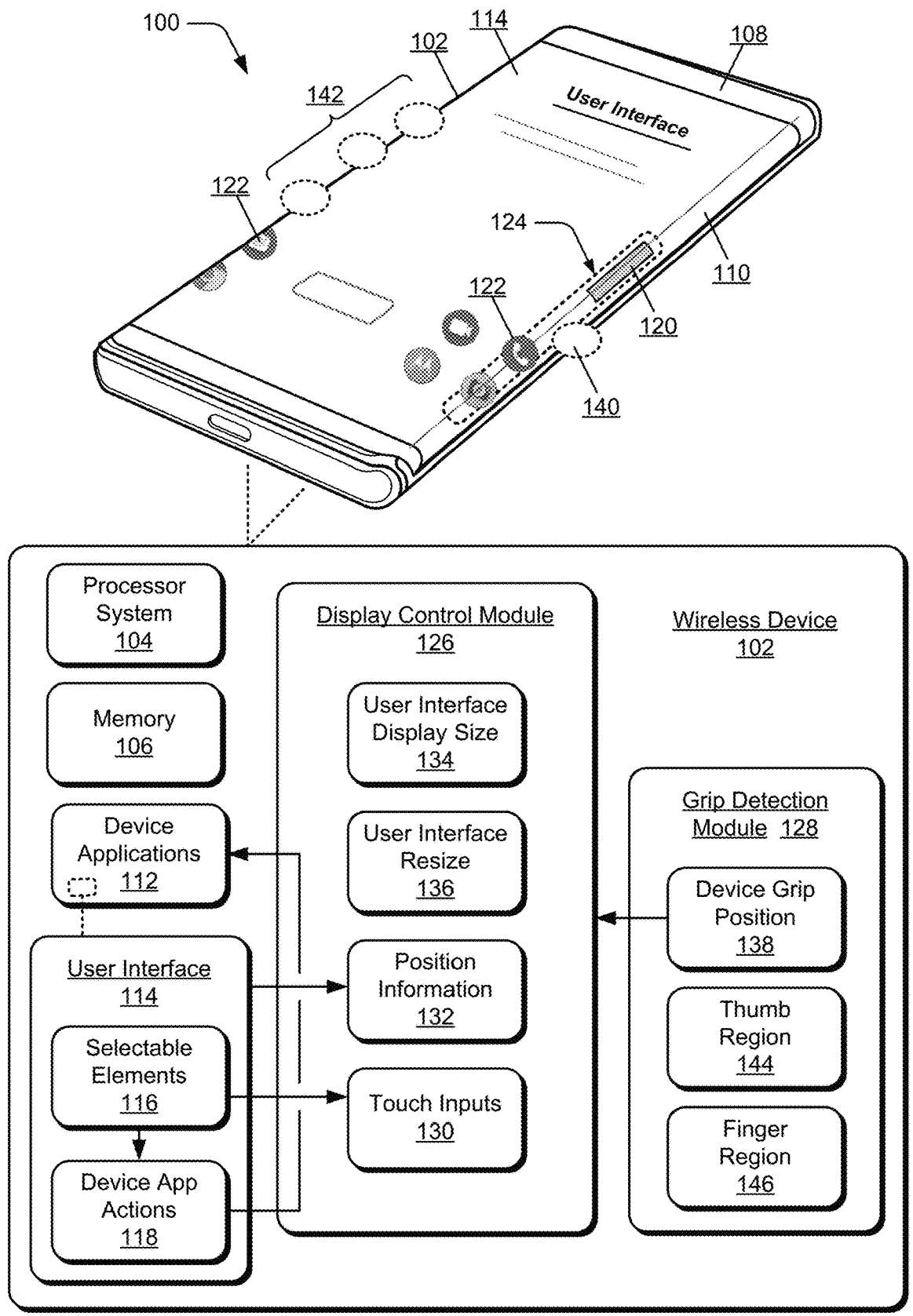
FIG. 1 illustrates an example of techniques for adaptive user interface display size for curved display edges using a wireless device in accordance with one or more implementations as described herein.

Implementations of adaptive user interface display size for curved display edges are described, and provide techniques that can be implemented by a wireless device, particularly for devices that display various user interfaces in different device modes, and for user interface selectable elements that are displayed within the curved display edges of a curved display screen. An optimal sizing of an application user interface can be determined so as to avoid displaying an actionable element of the user interface in the curved display area of the display screen.

A wireless device can include many different types of device applications, many of which generate or have a user interface that displays on the display screen of the device, as well as a lock screen user interface that typically turns-on and displays when a device is moved or picked-up for use. An application user interface or lock screen user interface typically includes selectable elements displayed in the user interface, and a selectable element can be selected by a user of the device with a touch input to initiate a corresponding device application action. A mobile device may also be implemented to operate in in a low-power mode with an always-on-display (AoD) in which the device processor is typically powered-down and the device display is implemented for low-power usage. The AoD mode may be used to detect movement or an approaching user, and operate the device in either a locked or unlocked state.

Notably, selectable elements in a user interface may be displayed over the curved transition region that transitions from the flat part of the display screen to the curved display edge of the display screen. These selectable elements that are displayed over the curved transition and/or within the curved display edges of a display screen may be difficult for a user to select or touch contact to initiate the selectable elements. Accordingly, the techniques for adaptive user interface display size for curved display edges can be implemented to decrease the overall size of a user interface so that the selectable elements are not displayed over the curved transition and/or in the curved display edges of the display screen. In implementations, a user interface may be resized in different ways, such as with a locked aspect ratio so that the user interface is resized in both length and width, resized in just width to display on the flat part of the display screen, and/or resized with an extended length.

In aspects of adaptive user interface display size for curved display edges, the wireless device has a curved display screen, which wraps around all or part of the vertical sides of the wireless device. The display screen can display a user interface, such as a device application user interface, a lock screen user interface, and/or an AoD mode user interface of the device that includes selectable elements, which are selectable to initiate respective device application actions. The wireless device implements a display control module that can determine a display size of the user interface effective to prevent the selectable elements of the user interface from being displayed within a curved display edge of the display screen. The display control module can then resize the user interface according to the determined display size, and initiate to display the user interface on the display screen, where at least a portion of the user interface is displayable within the curved display edges of the display screen and without the selectable elements of the user interface being displayed within the curved display edge of the display screen.

While features and concepts of adaptive user interface display size for curved display edges can be implemented in any number of different devices, systems, environments, and/or configurations, implementations of adaptive user interface display size for curved display edges are described in the context of the following example devices, systems, and methods.

FIG. 1 illustrates an example 100 of techniques for adaptive user interface display size for curved display edges, such as implemented with a wireless device 102. In this example 100, the wireless device 102 may be any type of a mobile phone, flip phone, computing device, tablet device, and/or any other type of mobile device. Generally, the wireless device 102 may be any type of an electronic, computing, and/or communication device implemented with various components, such as a processor system 104 and memory 106, as well as any number and combination of different components as further described with reference to the example device shown in FIG. 6. For example, the wireless device 102 can include a power source to power the device, such as a rechargeable battery and/or any other type of active or passive power source that may be implemented in an electronic, computing, and/or communication device.

The wireless device 102 includes a display screen 108, which in this example 100, is a curved display that wraps around, or partially wraps, the vertical sides of the wireless device. Generally, the display screen 108 has the curved display edges 110 on both vertical sides of the wireless device, and the curved display edges can be utilized to display any type of user interface or other display screen content. It should be noted that the techniques described herein for adaptive user interface display size for curved display edges are also applicable for a wireless device that has a traditional, flat display screen. The wireless device 102 also includes device applications 112, such as a text application, email application, video service application, cellular communication application, music application, and/or any other of the many possible types of device applications. Many device applications 112 have an associated user interface that is generated and displayed for user interaction and viewing. Similarly, a lock screen user interface may be displayed on the display screen 108 of the wireless device. In this example 100, the display screen 108 of the wireless device 102 can display a user interface 114 that is associated with a device application 112, or as a lock screen user interface.

The user interface 114 of a lock screen or device application 112 may include one or more selectable elements 116, which are user selectable, such as with a touch input, press, hold, or tap to initiate corresponding device application actions 118. For example, the user interface 114 displayed on the display screen 108 may be associated with a music playback application (e.g., any type of a device application 112), and the user interface includes selectable elements 116, such as a selectable element 120 that a user can select to control some device application action, or other selectable elements 122 that the user can select to initiate other device application actions. The user interface 114 includes the other various selectable elements 122 that a user can select with a touch input to initiate respective device application actions, such as to initiate the device camera, make a call, start a meeting, and the like.

In this example 100, the selectable element 120 of the user interface 114 is displayed over the curved transition region 124 that transitions from the flat part of the display screen to the curved display edge 110 of the display screen 108. Similarly, other selectable elements 122 of the user interface 114 are displayed over the curved transition from the flat part of the display screen to the curved display edges 110 of the display screen. These selectable elements 120, 122 that are displayed over the curved transition and/or in the curved display edges 110 of the display screen 108 may be difficult for a user to select or touch contact to initiate the selectable elements.

In this example 100, the wireless device 102 implements a display control module 126 and a grip detection module 128, which can be implemented as separate modules that may include independent processing, memory, and/or logic components functioning as a computing and/or electronic device integrated with the wireless device 102. Alternatively or in addition, either of the modules can be implemented in software, in hardware, or as a combination of software and hardware components. In this example, the display control module 126 and the grip detection module 128 are implemented as software applications or modules, such as executable software instructions (e.g., computer-executable instructions) that are executable with a processor (e.g., with the processor system 104) of the wireless device 102 to implement the techniques and features of adaptive user interface display size for curved display edges, as described herein.

As software applications or modules, the display control module 126 and the grip detection module 128 can be stored on computer-readable storage memory (e.g., the memory 106 of the device), or in any other suitable memory device or electronic data storage implemented with the modules. Alternatively or in addition, the display control module 126 and/or the grip detection module 128 may be implemented in firmware and/or at least partially in computer hardware. For example, at least part of the modules may be executable by a computer processor, and/or at least part of the modules may be implemented in logic circuitry.

In implementations, the display control module 126 is implemented by the wireless device 102 to manage and resize the display of the user interface 114 so as to prevent the selectable elements 120, 122 of the user interface from being displayed within a curved display edge 110 of the display screen 108. For example, the display control module 126 can be implemented to decrease the overall size of the user interface 114 so that the selectable elements 120, 122 are not displayed over the curved transition and/or in the curved display edges 110 of the display screen 108. In implementations, the user interface 114 may be resized by the display control module 126 in different ways, such as with a locked aspect ratio so that the user interface is resized in both length and width, resized in just width to display on the flat part of the display screen, and/or resized with an extended length.

The display control module 126 can determine, or receive notification, that the user interface 114 corresponds to an active lock screen or a foreground active device application 112, which causes the selectable elements 116 of the user interface 114 to be active and selectable. Generally, as described with reference to the example device shown in FIG. 6, the wireless device 102 has an operating system with a system layer (e.g., kernel layer) that can determine a foreground active device application has selectable elements that overlap the curved transition and/or are displayed in the curved display edges 110 of the display screen 108 by analyzing a view structure of the device application. The system layer can also receive indications of touch input events on the user interface 114 at the device layer when a user of the wireless device attempts to activate a device application action 118 by selecting a corresponding selectable element 116. The display control module 126 can register as an application, at the application layer, with the system layer to receive indications, notifications, and/or communications as to the selectable elements 116 that are displayed in a user interface 114. The display control module 126 can also manage the touch inputs 130, which are registered with the display control module, such as a user input that is received on the user interface 114 as a press, hold, tap, touch, or similar type input.

In aspects of the techniques for adaptive user interface display size for curved display edges, as described herein, the display control module 126 can determine that the user interface 114 corresponds to a foreground active device application or lock screen, as well as receive position information 132 that indicates respective display locations of the selectable elements 120, 122 in the user interface. The display control module 126 can determine or receive an indication of the user interface display size 134, and then determine a resize 136 of the user interface 114 effective to prevent the selectable elements 120, 122 of the user interface from being displayed over the curved transition region 124 and/or within the curved display edges 110 of the display screen 108. The display control module 126 can then initiate to resize the user interface 114 according to the determined resize 136. Notably, the display control module 126 can decrease the display size of the user interface 114 to accommodate the selectable elements 120, 122 being displayed on the flat portion of the display screen 108, as further shown and described below with reference to FIG. 2. Alternatively, the display control module 126 can be implemented to increase the display size of the user interface 114 in other scenarios, such as to display the selectable elements of the user interface 114 near the edge of the curved transition on the display screen.

Figure 2:
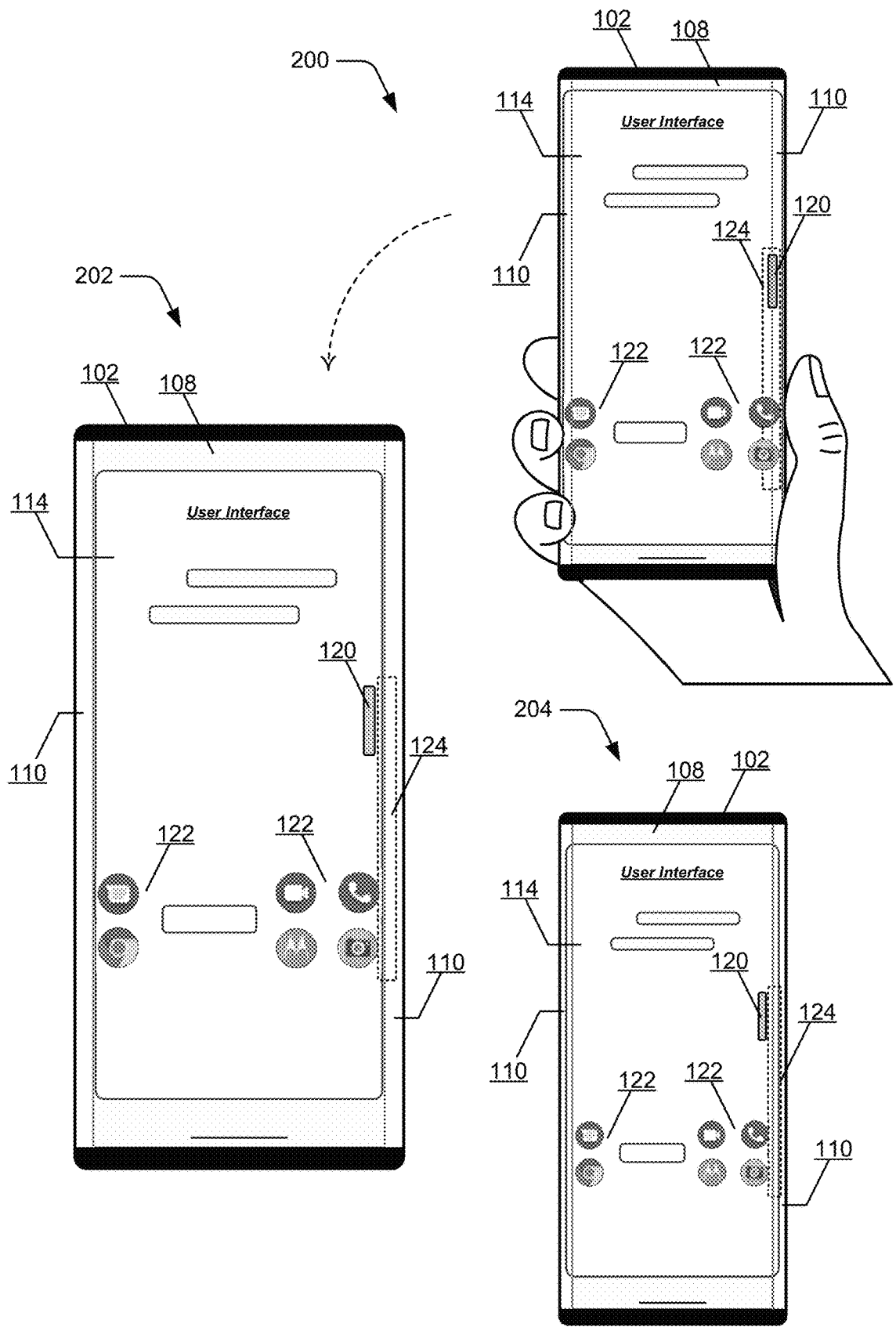
FIG. 2 illustrates examples of features for adaptive user interface display size for curved display edges using a wireless device in accordance with one or more implementations as described herein.

FIG. 2 illustrates examples 200 of aspects and features for adaptive user interface display size for curved display edges, as described herein, such as using the wireless device 102 as shown and described with reference to FIG. 1. As shown in the example 200, the display screen 108 of the wireless device 102 can display the user interface 114 that is associated with a device application 112, and the user interface includes the selectable elements 120, 122 that are associated with respective device application actions 118. For example, the selectable element 120 of the user interface 114 is displayed over the curved transition region 124 that transitions from the flat part of the display screen to the curved display edge 110 of the display screen 108. Similarly, other selectable elements 122 of the user interface 114 are displayed over the curved transition from the flat part of the display screen to the curved display edges 110 of the display screen. These selectable elements 120, 122 that are displayed over the curved transition and/or in the curved display edges 110 of the display screen 108 may be difficult for a user to select or touch contact to initiate the selectable elements.

As described above, the display control module 126 can determine that the user interface 114 is the active foreground display (e.g., the active user interface), as well as receive the position information 132 that indicates respective display locations of the selectable elements 120, 122 in the user interface. The display control module 126 can also determine a resize 136 of the user interface 114 effective to prevent the selectable elements 120, 122 of the user interface from being displayed over the curved transition region 124 and/or in the curved display edges 110 of the display screen 108. The display control module 126 can then initiate to resize the user interface 114 according to the determined resize 136 based on the determination that the user interface is the active foreground display.

For example, as shown at 202, the display control module 126 can resize the user interface 114 to display the selectable elements 120, 122 of the user interface on the flat surface of the display screen, and without the selectable elements of the user interface being displayed over the curved transition region 124 from the flat surface of the display screen 108 and/or in the curved display edges 110. Notably, at least the width of the user interface 114 has been decreased in the example shown at 202 so that the selectable elements 120, 122 are all displayed on the flat surface of the display screen 108. In implementations, the display control module 126 may resize the user interface 114 in different ways, such as to decrease the size of the displayed user interface with a locked aspect ratio so that the user interface 114 is resized in both length and width, resized in just width to display on the flat part of the display screen, and/or resized with an extended length. Additionally, in this example shown at 202, the user interface 114 is resized to display none of the user interface within the curved display edges 110 of the display screen. Alternatively, as shown at 204, the display control module 126 can resize the user interface 114 for display on the display screen 108, where a portion of the user interface 114 is displayed within the curved display edges 110 of the display screen, but without the selectable elements 120, 122 of the user interface being displayed within the curved display edges of the display screen.

Returning to the discussion of FIG. 1, the display control module 126 may also determine, or receive an indication, that the user interface 114 is no longer an active foreground display, in which case the user interface can be increased back to its original or intended user interface display size 134 to encompass the curved display edges 110 of the display screen 108. In other aspects of the described features for adaptive user interface display size, the display control module 126 may receive indications of false rejects associated with the touch inputs 130 on a selectable element 120, 122 of the user interface 114 that is displayed within a curved display edge 110 of the display screen 108, where the false rejects indicate that a device application action is not initiating responsive to the touch inputs. The false rejects can occur when a user of the wireless device 102 intends to initiate a device application action 118, but due to the display position of the selectable element 116 in the curved transition region 124 and/or within a curved display edge 110 of the display screen 108, the touch inputs 130 on the selectable element are not recognized to initiate the corresponding device application action. Typically, a user will attempt multiple touch inputs 130 on the selectable element 116 when the device application action 118 fails to initiate or activate. The display control module 126 can then resize the user interface 114 according to the determined display size (e.g., the user interface resize 136) responsive to the indications of the false rejects.

The grip detection module 128 is implemented by the wireless device 102 to detect the device grip position 138 of a user grip holding the wireless device. A representation of a user grip holding the device is generally shown as a thumb position 140 on one vertical side of the wireless device 102, and finger positions 142 on the other vertical side of the device, as if a user were holding the device with his or her right hand. Typically, a user grips and holds a device with his or her thumb on one side, and two or three fingers on the other side of the device, which also likely contacts or rests in some portion of the user's palm of his or her hand. The thumb position 140, the finger positions 142, and/or the user's palm of his or her hand also likely contact some areas of the curved display edges 110 of the display screen 108 and/or contact the display screen in the various regions that include the displayed selectable elements.

The grip detection module 128 can also determine which hand, left or right, the user is using to hold the wireless device 102, as well as the vertical position along the vertical sides of the device. Notably, the grip detection module 128 can determine a thumb region 144 of the device grip position 138 on a first side of the wireless device, such as proximate the thumb position 140. The grip detection module 128 can also determine a finger region 146 of the device grip position 138 on a second side of the wireless device, such as proximate the finger positions 142. In instances when a user changes hands and/or adjusts the grip position, the grip detection module 128 can detect a change in the device grip position 138 of the user grip holding the wireless device.

Example methods 300, 400, and 500 are described with reference to respective FIGS. 3, 4, and 5 in accordance with implementations of adaptive user interface display size for curved display edges. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
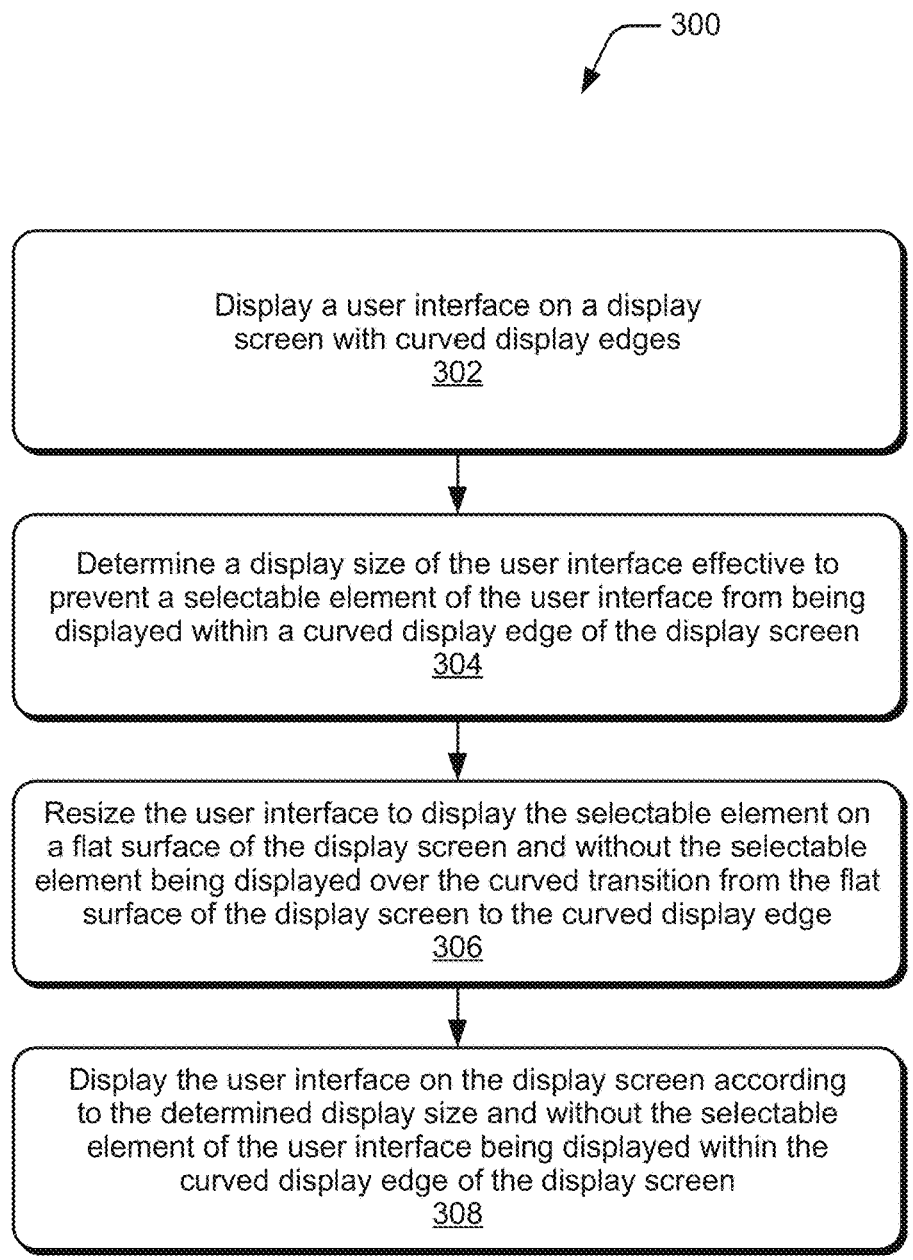
FIG. 3 illustrates an example method of adaptive user interface display size for curved display edges in accordance with one or more implementations of the techniques described herein.

FIG. 3 illustrates example method(s) 300 of adaptive user interface display size for curved display edges, and is generally described with reference to a wireless device, as well as a display control module implemented by the device. The order in which the method is described is not intended to be construed as a limitation, and any number or combination of the described method operations can be performed in any order to perform a method, or an alternate method.

At 302, a user interface is displayed on a display screen with curved display edges. For example, the display screen 108 of the wireless device 102 displays the user interface 114 that is associated with a device application 112, or as a lock screen user interface. The user interface 114 of a lock screen or device application 112 may include one or more selectable elements 116, which are user selectable to initiate corresponding device application actions 118.

At 304, a display size of the user interface is determined effective to prevent a selectable element of the user interface from being displayed within a curved display edge of the display screen. For example, the display control module 126 can determine or receive an indication of the user interface display size 134, and then determine the resize 136 of the user interface 114 effective to prevent the selectable elements 120, 122 of the user interface from being displayed over the curved transition region 124 and/or within the curved display edges 110 of the display screen 108.

At 306, the user interface is resized to display the selectable element on a flat surface of the display screen and without the selectable element being displayed over the curved transition from the flat surface of the display screen to the curved display edge. For example, the display control module 126 can initiate to resize the user interface 114 according to the determined resize 136, in particular decreasing the display size of the user interface 114 to accommodate the selectable elements 120, 122 being displayed on the flat portion of the display screen 108 so that the selectable elements are not displayed over the curved transition region 124 and/or within the curved display edges 110 of the display screen 108.

At 308, the user interface is displayed on the display screen according to the determined display size and without the selectable element of the user interface being displayed within the curved display edge of the display screen. For example, the display control module 126 can resize the user interface 114 to display the selectable elements 120, 122 of the user interface on the flat surface of the display screen, and without the selectable elements of the user interface being displayed over the curved transition region 124 from the flat surface of the display screen 108 and/or within the curved display edges 110. In implementations, the display control module 126 can determine the display size of the user interface 114 based on the received position information 132 that indicates the respective display locations of the selectable elements.

Figure 4:
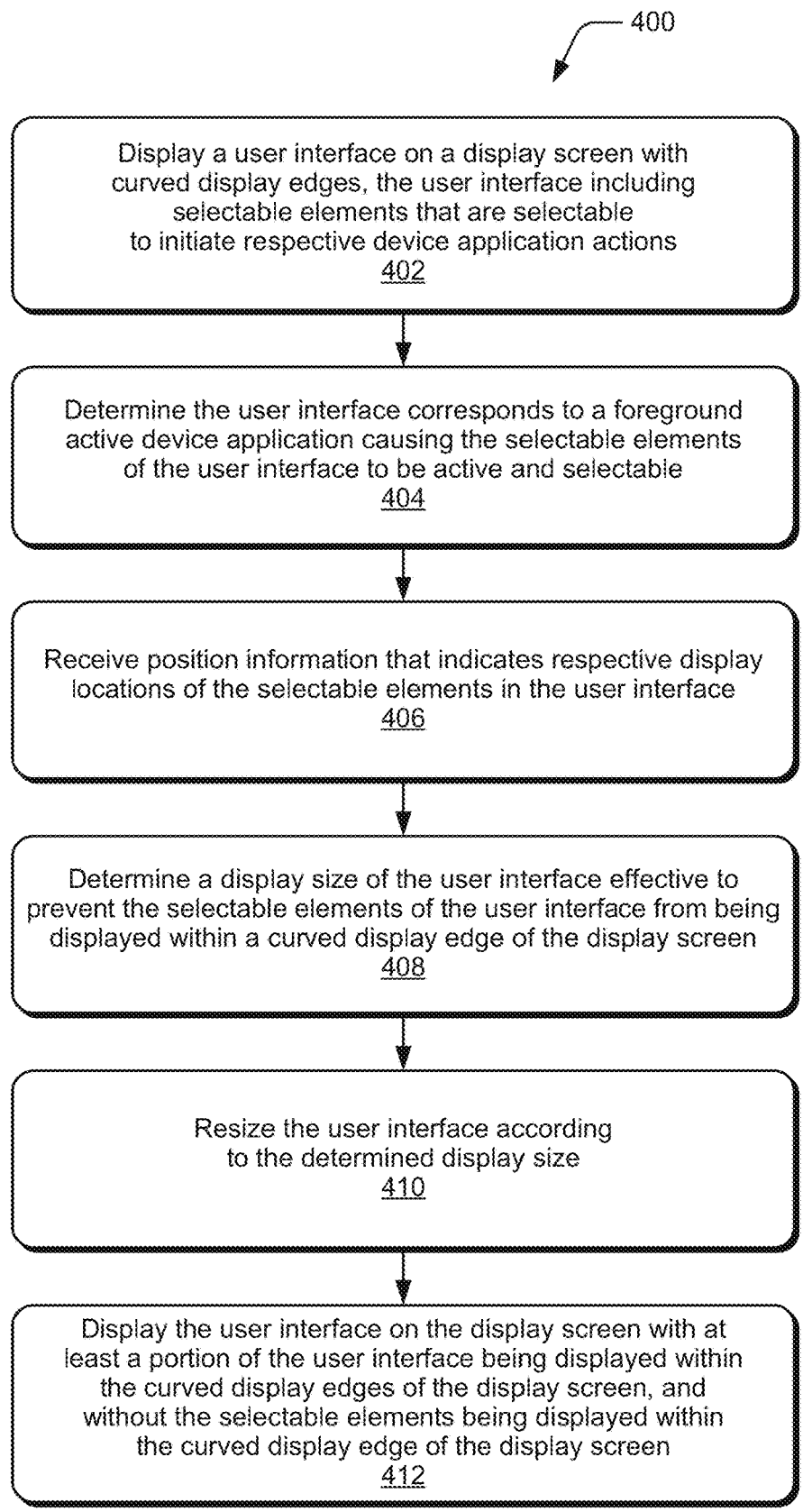
FIG. 4 illustrates another example method of adaptive user interface display size for curved display edges in accordance with one or more implementations of the techniques described herein.

FIG. 4 illustrates example method(s) 400 of adaptive user interface display size for curved display edges, and is generally described with reference to a wireless device, as well as a display control module implemented by the device. The order in which the method is described is not intended to be construed as a limitation, and any number or combination of the described method operations can be performed in any order to perform a method, or an alternate method.

At 402, a user interface is displayed on a display screen with curved display edges, the user interface including selectable elements that are selectable to initiate respective device application actions. For example, the display screen 108 of the wireless device 102 displays the user interface 114 that is associated with a device application 112, or as a lock screen user interface. The user interface 114 of a lock screen or device application 112 may include one or more selectable elements 116, which are user selectable to initiate corresponding device application actions 118.

At 404, a determination is made that the user interface corresponds to a foreground active device application causing the selectable elements of the user interface to be active and selectable. For example, the display control module 126 can determine, or receive notification, that the user interface 114 corresponds to an active lock screen or a foreground active device application 112, which causes the selectable elements 116 of the user interface 114 to be active and selectable.

At 406, position information is received that indicates respective display locations of the selectable elements in the user interface. For example, the display control module 126 can receive the position information 132 that indicates respective display locations of the selectable elements 120, 122 in the user interface. In implementations, the display control module 126 can register as an application, at the application layer, with the system layer to receive indications, notifications, and/or communications as to the selectable elements 116 that are displayed in a user interface 114.

At 408, a display size of the user interface is determined effective to prevent the selectable elements of the user interface from being displayed within a curved display edge of the display screen. For example, the display control module 126 can determine or receive an indication of the user interface display size 134, and then determine the resize 136 of the user interface 114 effective to prevent the selectable elements 120, 122 of the user interface from being displayed over the curved transition region 124 and/or within the curved display edges 110 of the display screen 108. In implementations, the display control module 126 can determine the resize 136 of the user interface 114 based on the respective display locations of the selectable elements effective to prevent the selectable elements from being displayed within the curved display edges 110 of the display screen 108.

At 410, the user interface is resized according to the determined display size. For example, the display control module 126 can initiate to resize the user interface 114 according to the determined resize 136, in particular decreasing the display size of the user interface 114 to accommodate the selectable elements 120, 122 being displayed on the flat portion of the display screen 108 so that the selectable elements are not displayed over the curved transition region 124 and/or within the curved display edges 110 of the display screen 108. In implementations, the display control module 126 can resize the user interface according to the determined resize 136 responsive to the determination that the user interface corresponds to the foreground active device application.

At 412, the user interface is displayed on the display screen with at least a portion of the user interface being displayed within the curved display edges of the display screen, and without the selectable elements being displayed within the curved display edge of the display screen. For example, the display control module 126 can initiate to resize and display the user interface 114 on the display screen 108 with a portion of the user interface 114 displayed within the curved display edges 110 of the display screen, yet without the selectable elements 120, 122 of the user interface being displayed within the curved display edges 110 of the display screen. Alternatively, the display control module 126 can initiate to display the user interface 114 on the display screen 108 with none of the user interface displayed within the curved display edges 110 of the display screen 108.

Figure 5:
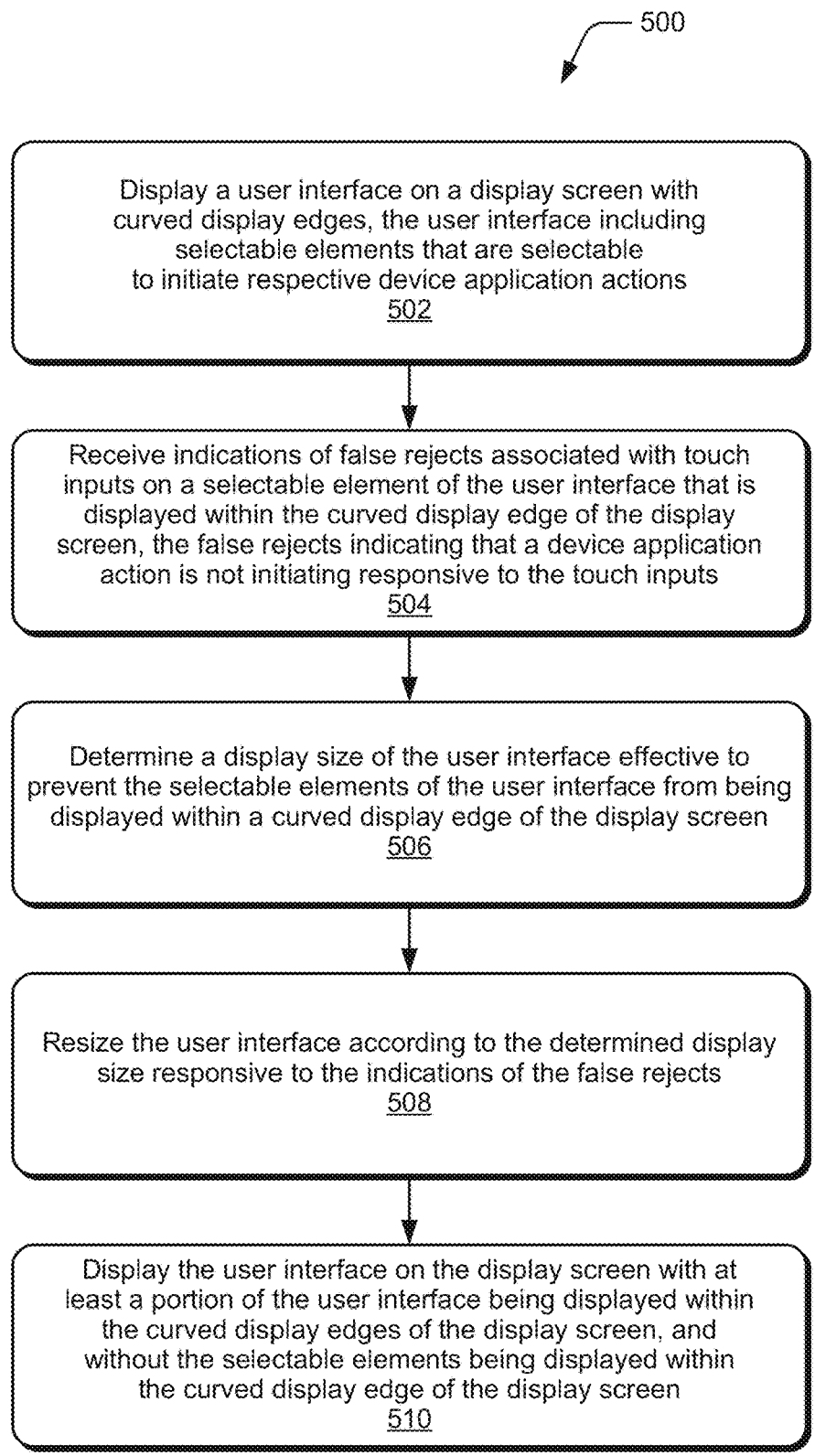
FIG. 5 illustrates another example method of adaptive user interface display size for curved display edges in accordance with one or more implementations of the techniques described herein.

FIG. 5 illustrates example method(s) 500 of adaptive user interface display size for curved display edges, and is generally described with reference to a wireless device, as well as a display control module implemented by the device. The order in which the method is described is not intended to be construed as a limitation, and any number or combination of the described method operations can be performed in any order to perform a method, or an alternate method.

At 502, a user interface is displayed on a display screen with curved display edges, the user interface including selectable elements that are selectable to initiate respective device application actions. For example, the display screen 108 of the wireless device 102 displays the user interface 114 that is associated with a device application 112, or as a lock screen user interface. The user interface 114 of a lock screen or device application 112 may include one or more selectable elements 116, which are user selectable to initiate corresponding device application actions 118.

At 504, indications of false rejects are received, the false rejects associated with touch inputs on a selectable element of the user interface that is displayed within the curved display edge of the display screen, the false rejects indicating that a device application action is not initiating responsive to the touch inputs. For example, the display control module 126 can receive indications of false rejects associated with the touch inputs 130 on a selectable element 120, 122 of the user interface 114 that is displayed within a curved display edge 110 of the display screen 108, where the false rejects indicate that a device application action is not initiating responsive to the touch inputs. The false rejects can occur when a user of the wireless device 102 intends to initiate a device application action 118, but due to the display position of the selectable element 116 in the curved transition region 124 and/or within a curved display edge 110 of the display screen 108, the touch inputs 130 on the selectable element are not recognized to initiate the corresponding device application action. Typically, a user will attempt multiple touch inputs 130 on the selectable element 116 when the device application action 118 fails to initiate or activate.

At 506, a display size of the user interface is determined effective to prevent the selectable elements of the user interface from being displayed within a curved display edge of the display screen. For example, the display control module 126 can determine or receive an indication of the user interface display size 134, and then determine the resize 136 of the user interface 114 effective to prevent the selectable elements 120, 122 of the user interface from being displayed over the curved transition region 124 and/or within the curved display edges 110 of the display screen 108.

At 508, the user interface is resized according to the determined display size responsive to the indications of the false rejects. For example, the display control module 126 can initiate to resize the user interface 114 according to the determined resize 136, in particular decreasing the display size of the user interface 114 to accommodate the selectable elements 120, 122 being displayed on the flat portion of the display screen 108 responsive to the indications of the false rejects. In implementations, the display control module 126 can resize the user interface 114 to display the selectable elements 120, 122 of the user interface on a flat surface of the display screen 108 and without the selectable elements being displayed over the curved transition region 124 from the flat surface of the display screen to the curved display edge.

At 510, the user interface is displayed on the display screen with at least a portion of the user interface being displayed within the curved display edges of the display screen, and without the selectable elements being displayed within the curved display edge of the display screen. For example, the display control module 126 can initiate to resize and display the user interface 114 on the display screen 108 with a portion of the user interface 114 displayed within the curved display edges 110 of the display screen, yet without the selectable elements 120, 122 of the user interface being displayed within the curved display edges 110 of the display screen. Alternatively, the display control module 126 can initiate to display the user interface 114 on the display screen 108 with none of the user interface displayed within the curved display edges 110 of the display screen 108.

Figure 6:
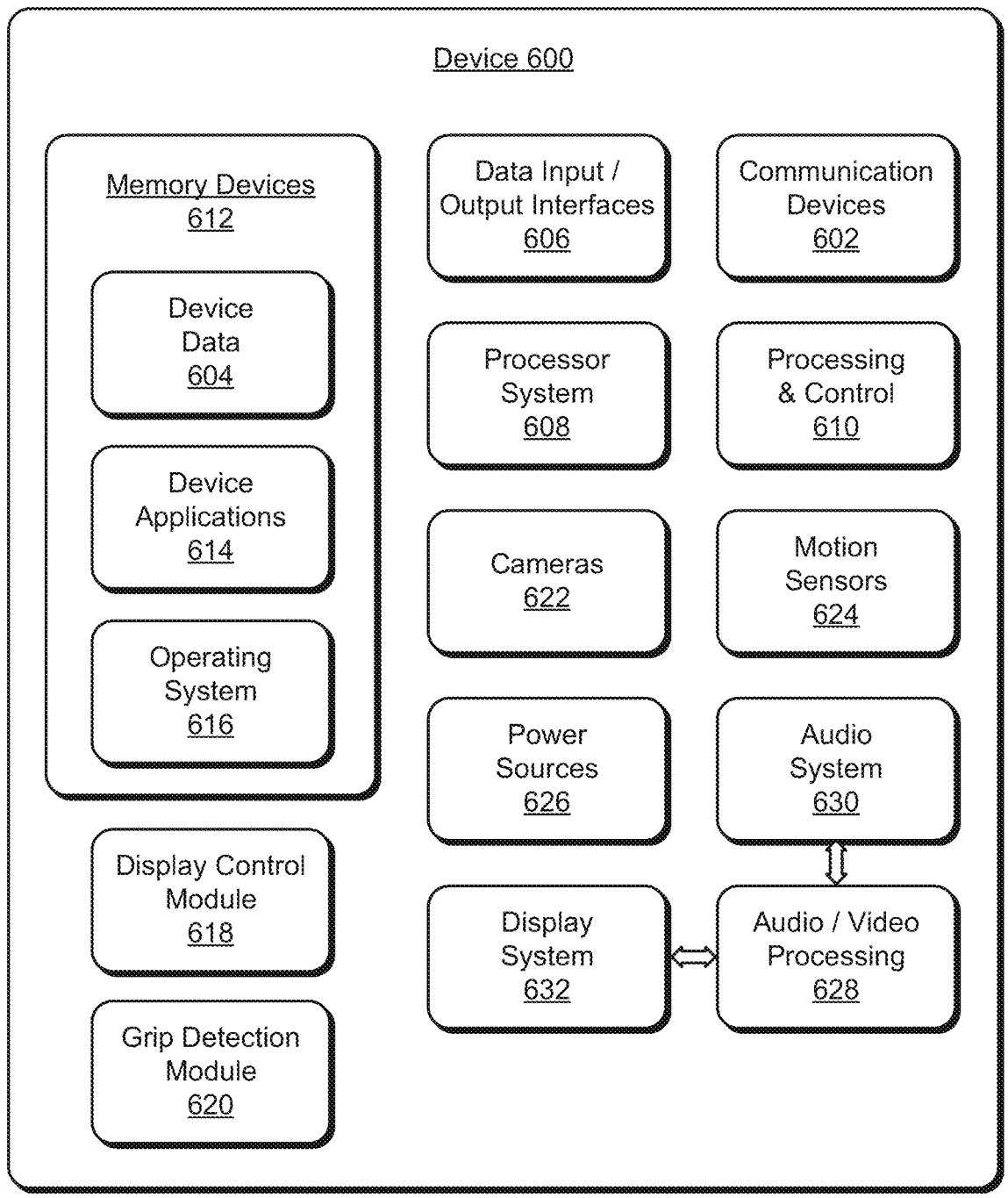
FIG. 6 illustrates various components of an example device that can be used to implement the techniques for adaptive user interface display size for curved display edges as described herein.

FIG. 6 illustrates various components of an example device 600, which can implement aspects of the techniques and features for adaptive user interface display size for curved display edges, as described herein. The example device 600 can be implemented as any of the devices described with reference to the previous FIGS. 1-5, such as any type of a wireless device, mobile device, mobile phone, flip phone, client device, companion device, paired device, display device, tablet, computing, communication, entertainment, gaming, media playback, and/or any other type of computing and/or electronic device. For example, the wireless device 102 described with reference to FIGS. 1-5 may be implemented as the example device 600.

The example device 600 can include various, different communication devices 602 that enable wired and/or wireless communication of device data 604 with other devices. The device data 604 can include any of the various devices data and content that is generated, processed, determined, received, stored, and/or transferred from one computing device to another, and/or synched between multiple computing devices. Generally, the device data 604 can include any form of audio, video, image, graphics, and/or electronic data that is generated by applications executing on a device. The communication devices 602 can also include transceivers for cellular phone communication and/or for any type of network data communication.

The example device 600 can also include various, different types of data input/output (I/O) interfaces 606, such as data network interfaces that provide connection and/or communication links between the devices, data networks, and other devices. The I/O interfaces 606 can be used to couple the device to any type of components, peripherals, and/or accessory devices, such as a computer input device that may be integrated with the example device 600. The I/O interfaces 606 may also include data input ports via which any type of data, information, media content, communications, messages, and/or inputs can be received, such as user inputs to the device, as well as any type of audio, video, image, graphics, and/or electronic data received from any content and/or data source.

The example device 600 includes a processor system 608 of one or more processors (e.g., any of microprocessors, controllers, and the like) and/or a processor and memory system implemented as a system-on-chip (SoC) that processes computer-executable instructions. The processor system may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that may be implemented in connection with processing and control circuits, which are generally identified at 610. The example device 600 may also include any type of a system bus or other data and command transfer system that couples the various components within the device. A system bus can include any one or combination of different bus structures and architectures, as well as control and data lines.

The example device 600 also includes memory and/or memory devices 612 (e.g., computer-readable storage memory) that enable data storage, such as data storage devices implemented in hardware that can be accessed by a computing device, and that provide persistent storage of data and executable instructions (e.g., software applications, programs, functions, and the like). Examples of the memory devices 612 include volatile memory and non-volatile memory, fixed and removable media devices, and any suitable memory device or electronic data storage that maintains data for computing device access. The memory devices 612 can include various implementations of random-access memory (RAM), read-only memory (ROM), flash memory, and other types of storage media in various memory device configurations. The example device 600 may also include a mass storage media device.

The memory devices 612 (e.g., as computer-readable storage memory) provide data storage mechanisms, such as to store the device data 604, other types of information and/or electronic data, and various device applications 614 (e.g., software applications and/or modules). For example, an operating system 616 can be maintained as software instructions with a memory device and executed by the processor system 608 as a software application. The device applications 614 may also include a device manager, such as any form of a control application, software application, signal-processing and control module, code that is specific to a particular device, a hardware abstraction layer for a particular device, and so on.

In this example, the device 600 includes a display control module 618 and a grip detection module 620 that implement various aspects of the described features and techniques for adaptive user interface display size for curved display edges. The modules may each be implemented with hardware components and/or in software as one of the device applications 614, such as when the example device 600 is implemented as the wireless device 102 described with reference to FIGS. 1-5. An example of the display control module 618 includes the display control module 126, and an example of the grip detection module 620 includes the grip detection module 128 that is implemented by the wireless device 102, such as software applications and/or as hardware components in the wireless device. In implementations, the display control module 618 and the grip detection module 620 may include independent processing, memory, and logic components as a computing and/or electronic device integrated with the example device 600.

The example device 600 can also include cameras 622 and/or motion sensors 624, such as may be implemented as components of an inertial measurement unit (IMU). The motion sensors 624 can be implemented with various sensors, such as a gyroscope, an accelerometer, and/or other types of motion sensors to sense motion of the device. The motion sensors 624 can generate sensor data vectors having three-dimensional parameters (e.g., rotational vectors in x, y, and z-axis coordinates) indicating location, position, acceleration, rotational speed, and/or orientation of the device. The example device 600 can also include one or more power sources 626, such as when the device is implemented as a wireless device and/or mobile device. The power sources may include a charging and/or power system, and can be implemented as a flexible strip battery, a rechargeable battery, a charged super-capacitor, and/or any other type of active or passive power source.

The example device 600 can also include an audio and/or video processing system 628 that generates audio data for an audio system 630 and/or generates display data for a display system 632. The audio system and/or the display system may include any types of devices that generate, process, display, and/or otherwise render audio, video, display, and/or image data. Display data and audio signals can be communicated to an audio component and/or to a display component via any type of audio and/or video connection or data link. In implementations, the audio system and/or the display system are integrated components of the example device 600. Alternatively, the audio system and/or the display system are external, peripheral components to the example device.

Although implementations of adaptive user interface display size for curved display edges have been described in language specific to features and/or methods, the appended claims are not necessarily limited to the specific features or methods described. Rather, the specific features and methods are disclosed as example implementations of adaptive user interface display size for curved display edges, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A wireless device, comprising: a display screen with curved display edges to display a user interface that includes one or more selectable elements that are selectable to initiate respective device application actions; a display control module implemented at least partially in hardware and configured to: determine a display size of the user interface effective to prevent the one or more selectable elements of the user interface from being displayed within a curved display edge of the display screen; resize the user interface according to the determined display size; and initiate to display the user interface on the display screen, at least a portion of the user interface being displayable within the curved display edges of the display screen without the one or more selectable elements of the user interface being displayed within the curved display edge of the display screen.

Alternatively or in addition to the above described wireless device, any one or combination of: the display control module is configured to decrease the display size of the user interface to resize the user interface according to the determined display size. The display control module is configured to receive position information that indicates a display location of a selectable element in the user interface, and determine the display size of the user interface based on the display location of the selectable element effective to prevent the selectable element from being displayed within the curved display edge of the display screen. The display control module is configured to determine the user interface corresponds to a foreground active device application causing the one or more selectable elements of the user interface to be active and selectable, and resize the user interface according to the determined display size responsive to the determination that the user interface corresponds to the foreground active device application. The display control module is configured to resize the user interface to display the one or more selectable elements of the user interface on a flat surface of the display screen and without the one or more selectable elements of the user interface being displayed over the curved transition from the flat surface of the display screen to the curved display edge. The display control module is configured to resize the user interface to display none of the user interface within the curved display edges of the display screen. The display control module is configured to determine the user interface is no longer an active foreground display, and increase the display size of the user interface to encompass the curved display edges of the display screen. The display control module is configured to receive indications of false rejects associated with touch inputs on a selectable element of the user interface that is displayed within the curved display edge of the display screen, the false rejects indicating that a device application action is not initiating responsive to the touch inputs, and resize the user interface according to the determined display size responsive to the indications of the false rejects.

A method, comprising: displaying a user interface on a display screen with curved display edges, the user interface including one or more selectable elements that are selectable to initiate respective device application actions; determining a display size of the user interface effective to prevent the one or more selectable elements of the user interface from being displayed within a curved display edge of the display screen; resizing the user interface according to the determined display size; and displaying the user interface on the display screen, at least a portion of the user interface being displayed within the curved display edges of the display screen without the one or more selectable elements of the user interface being displayed within the curved display edge of the display screen.

Alternatively or in addition to the above described method, any one or combination of: the resizing the user interface includes decreasing the display size of the user interface according to the determined display size. The method further comprising receiving position information that indicates a display location of a selectable element in the user interface, and determining the display size of the user interface based on the display location of the selectable element effective to prevent the selectable element from being displayed within the curved display edge of the display screen. The method further comprising determining the user interface corresponds to a foreground active device application causing the one or more selectable elements of the user interface to be active and selectable, and resizing the user interface according to the determined display size responsive to the determination that the user interface corresponds to the foreground active device application. The method further comprising resizing the user interface to display the one or more selectable elements of the user interface on a flat surface of the display screen and without the one or more selectable elements of the user interface being displayed over the curved transition from the flat surface of the display screen to the curved display edge. The method further comprising resizing the user interface to display none of the user interface within the curved display edges of the display screen. The method further comprising determining the user interface is no longer an active foreground display, and increasing the display size of the user interface to encompass the curved display edges of the display screen. The method further comprising receiving indications of false rejects associated with touch inputs on a selectable element of the user interface that is displayed within the curved display edge of the display screen, the false rejects indicating that a device application action is not initiating responsive to the touch inputs, and resizing the user interface according to the determined display size responsive to the indications of the false rejects.

A method, comprising: displaying a user interface on a display screen with curved display edges; determining a display size of the user interface effective to prevent a selectable element of the user interface from being displayed within a curved display edge of the display screen; and displaying the user interface on the display screen according to the determined display size and without the selectable element of the user interface being displayed within the curved display edge of the display screen.

Alternatively or in addition to the above described method, any one or combination of: decreasing the display size of the user interface to display on the display screen. The determining the display size of the user interface is based on position information that indicates a display location of the selectable element. The method further comprising resizing the user interface to display the selectable element on a flat surface of the display screen and without the selectable element of the user interface being displayed over the curved transition from the flat surface of the display screen to the curved display edge.

The invention claimed is:

1. A wireless device, comprising:
a display screen with curved display edges to display a user interface that includes one or more selectable elements that are selectable to initiate respective device application actions;
a display control module implemented at least partially in hardware and configured to:
receive an indication of a first display size for the user interface effective to display the one or more selectable elements within a curved display edge of the display screen;
determine a second display size for the user interface effective to prevent the one or more selectable elements of the user interface from being displayed within the curved display edge of the display screen; and
resize the user interface from the first display size to the second display size effective to initiate display of the user interface on the display screen according to the second display size, at least a portion of the user interface being displayable within the curved display edges of the display screen without the one or more selectable elements of the user interface being displayed within the curved display edge of the display screen.

2. The wireless device of claim 1, wherein the display control module is configured to decrease a display size of the user interface to resize the user interface according to the second display size.

3. The wireless device of claim 1, wherein the display control module is configured to:
receive position information that indicates a display location of a selectable element in the user interface; and
determine the second display size of the user interface based on the display location of the selectable element effective to prevent the selectable element from being displayed within the curved display edge of the display screen.

4. The wireless device of claim 1, wherein the display control module is configured to:
determine the user interface corresponds to a foreground active device application causing the one or more selectable elements of the user interface to be active and selectable; and
resize the user interface according to the second display size responsive to the determination that the user interface corresponds to the foreground active device application.

5. The wireless device of claim 1, wherein the display control module is configured to resize the user interface to display the one or more selectable elements of the user interface on a flat surface of the display screen and without the one or more selectable elements of the user interface being displayed over a curved transition from the flat surface of the display screen to the curved display edge.

6. The wireless device of claim 1, wherein the display control module is configured to resize the user interface to display none of the user interface within the curved display edges of the display screen.

7. The wireless device of claim 1, wherein the display control module is configured to:
determine the user interface is no longer an active foreground display; and
increase a display size of the user interface to encompass the curved display edges of the display screen.

8. The wireless device of claim 1, wherein the display control module is configured to:
resize the user interface according to the second display size effective to prevent false rejects associated with touch inputs on a selectable element of the user interface.

9. A method, comprising:
displaying a user interface on a display screen with curved display edges, the user interface including one or more selectable elements that are selectable to initiate respective device application actions, the user interface displayed in a first display size in which the one or more selectable elements are displayed within a curved display edge of the display screen;
determining a second display size for the user interface effective to prevent the one or more selectable elements of the user interface from being displayed within the curved display edge of the display screen; and
resizing the user interface from the first display size to the second display size effective to display the user interface on the display screen according to the second display size, at least a portion of the user interface being displayed within the curved display edges of the display screen without the one or more selectable elements of the user interface being displayed within the curved display edge of the display screen.

10. The method of claim 9, wherein the resizing the user interface includes decreasing a display size of the user interface according to the second display size.

11. The method of claim 9, further comprising:
receiving position information that indicates a display location of a selectable element in the user interface; and
determining the second display size of the user interface based on the display location of the selectable element effective to prevent the selectable element from being displayed within the curved display edge of the display screen.

12. The method of claim 9, further comprising:
determining the user interface corresponds to a foreground active device application causing the one or more selectable elements of the user interface to be active and selectable; and
resizing the user interface according to the second display size responsive to the determination that the user interface corresponds to the foreground active device application.

13. The method of claim 9, further comprising resizing the user interface to display the one or more selectable elements of the user interface on a flat surface of the display screen and without the one or more selectable elements of the user interface being displayed over a curved transition from the flat surface of the display screen to the curved display edge.

14. The method of claim 9, further comprising resizing the user interface to display none of the user interface within the curved display edges of the display screen.

15. The method of claim 9, further comprising:
determining the user interface is no longer an active foreground display; and
increasing a display size of the user interface to encompass the curved display edges of the display screen.

16. The method of claim 9, further comprising:
resizing the user interface according to the second display size effective to prevent false rejects associated with touch inputs on a selectable element of the user interface.

17. A method, comprising:
displaying a user interface on a display screen with curved display edges, the user interface displayed in a first display size in which a selectable element of the user interface is displayed within a curved display edge of the display screen;
receiving indications of false rejects associated with touch inputs on the selectable element of the user interface that is displayed within the curved display edge of the display screen, the false rejects indicating that a device application action is not initiating responsive to the touch inputs;
determining a second display size for the user interface effective to prevent the selectable element of the user interface from being displayed within the curved display edge of the display screen; and
responsive to receiving the indications of the false rejects, resizing the user interface from the first display size to the second display size to display the user interface on the display screen according to the second display size, at least a portion of the user interface being displayed within the curved display edges of the display screen without the selectable element of the user interface being displayed within the curved display edge of the display screen.

18. The method of claim 17, wherein the indications of the false rejects are received as multiple touch inputs on the selectable element without the device application action associated with the selectable element initiating responsive to the touch inputs.

19. The method of claim 17, wherein the determining the second display size of the user interface is based on position information that indicates a display location of the selectable element.

20. The method of claim 17, further comprising resizing the user interface to display the selectable element on a flat surface of the display screen and without the selectable element of the user interface being displayed over a curved transition from the flat surface of the display screen to the curved display edge.

* * * * *